Dec. 29, 1970    R. BROOKS ET AL    3,551,097
PRODUCTION OF SODIUM BICARBONATE USING BAFFLED COOLING TUBE
COMPARTMENTS IN A TOWER
Filed Dec. 20, 1968    3 Sheets-Sheet 1

INVENTORS
RICHARD BROOKS
BY PAUL TASIAUX

Cushman, Darby & Cushman
ATTORNEYS

United States Patent Office 3,551,097
Patented Dec. 29, 1970

3,551,097
PRODUCTION OF SODIUM BICARBONATE USING BAFFLED COOLING TUBE COMPARTMENTS IN A TOWER
Richard Brooks, Northwich, England, and Paul Tasiaux, Boitsfort, Brussels, Belgium, assignors to Imperial Chemical Industries Limited, London, England, a corporation of Great Britain, and Solvay & Cie, Brussels, Belgium, a Belgian company
Continuation-in-part of application Ser. No. 461,333, June 4, 1965. This application Dec. 20, 1968, Ser. No. 785,716
Claims priority, application Great Britain, June 16, 1964, 24,919/64
Int. Cl. C01d 7/18
U.S. Cl. 23—65    7 Claims

ABSTRACT OF THE DISCLOSURE

There is provided a process and apparatus for producing sodium bicarbonate by reacting carbon dioxide gas with ammonia and sodium chloride. The invention resides in providing an upward flow of carbon dioxide gas through a series of connecting compartments each of which have a perforated base for passing the gas therethrough and a conduit disposed in the said base. The ammonia and sodium chloride solution is passed from one compartment to the next thereunder by the conduit and the gas is flowed through the perforated base at a rate sufficient to agitate the solution and keep the solid crystalline sodium bicarbonate suspended therein and to prevent any substantial amount of the solution from passing through the perforated base. The compartments are maintained about one-half full of solution accomplishing a "flooded" condition. The solution is flowed laterally through at least one (1) compartment which contains a bundle of cooling tubes therein. The cooling tubes are disposed in a lateral direction and the gas is caused to pass upwardly through the bundle of cooling tubes. Baffles are arranged to guide the ascending gaseous phases issuing from the perforated plate next below said bundle up through some parts of the bundle and then down through the other portions of the cooling bundle, and thence up again to the perforated plate next above said bundle.

---

This is a continuation-in-part of application Ser. No. 461,333, filed on June 4, 1965, now abandoned.

This invention relates to the crystallization of salts from liquid systems, particularly aqueous systems in which the crystalline phase is formed by the reaction of a gas with the liquid phase, and more specifically to the precipitation of sodium bicarbonate in the ammonia-soda process.

The experiments and background on which the invention is based relate to the ammonia-soda process, and the description in this specification will use the idiom and terminology of that process, but we believe the principles behind the invention are more widely applicable, for example in the absorption of sulphur dioxide in alkaline solutions. The process of the invention is to be understood as a crystallization operation occurring in an apparatus comprising a series of interconnected compartments arranged one on top of the other in the form of a column.

Three important principles behind the invention are that the gas that reacts should also stir the aqueous system and give to it the desired degree of turbulence; that practically all of the solid phase should at all times be in suspension and not settle into deposits; and that it should be suitable to design the apparatus for a desired weight-ratio of solids to liquids in the magma that flows from one compartment to the next below. This last requirement is not realizable in the carbonating towers of the ammonia-soda process as currently operated, for the design of the passettes between the compartments of the so-called Solvay towers of the ammonia-soda process admits of little or no variation of the solid/liquid ratio.

It is the principal object of the present invention to provide an apparatus and process which one skilled in the art may use to achieve a desired movement of solids relative to liquids in crystallization processes as hereinbefore described, and more particularly in regard to the ammonia-soda process, to achieve inside the column (where sodium bicarbonate is precipitated by reactions between carbon dioxide and aqueous solutions of sodium chloride containing ammonia) a higher concentration of solids in the liquors than has heretofore been possible. And it is a further object to secure an optimum flow and circulation of the sodium bicarbonate magmas, especially in those regions where they undergo cooling. In this specification the term magma means a suspension of solids in an aqueous phase.

The above and other related objects of the invention are achieved by replacing the passettes, which in the known carbonating towers of the ammonia-soda process separate one compartment from the next, with plates having perforations through which rising gas passes and also supporting conduits through which magma flows downwards. Gas-flow and magma-flow between compartments are thus separated in contrast to the regime in the known carbonating towers of the ammonia-soda process where gas and magma flow countercurrently along the same path.

Thus, briefly stated the invention provides an apparatus and a process adapted to enable a gas to react with an aqueous system to yield a solid crystalline phase. The process uses an apparatus comprising a plurality of compartments arranged one on top of another in the form of a column with adjacent compartments being separated by partitions in the form of plates perforated with a plurality of holes for the passage of gaseous phases from one compartment to the next above. Each plate also supporting at least one conduit arranged for the passage by gravity of crystal magma from one compartment to the next below and is so positioned that magma entering a compartment by a conduit cannot fall directly into any conduit leading magma out of the same compartment. Also, orifices are suitably disposed in the column of compartments for the introduction of gases and of aqueous phases thereto and for the removal of crystal magma and waste gases therefrom. It is further advantageous to assist the circulation of the gases and aqueous phases in the compartments by the insertion of baffles into the compartment, which channel the gas through predetermined paths. However, no great advantage is gained with such baffles in the majority of the compartments, provided the pattern of perforations in the plates is chosen suitably. However, according to the invention such baffles should be used in compartments containing bundles of cooling tubes, and in such compartments it is quite advantageous to make use of baffles to control the circulation of the crystal magma, although it is possible to operate without them. Therefore in applying the invention to the ammonia-soda process, where it is known common practice to cool the magma of sodium bicarbonate crystals in the lower parts of the carbonating towers, according to the invention, the compartments are not only separated by perforated plates but there are also employed a suitable baffle system in those compartments that contain cooling tubes to control the circulation of magma and gases.

Thus, according to the invention there is provided an apparatus and process as hereinbefore described in which at least one of the lower compartments contains at least one bundle of spaced cooling tubes, over which the crystal magma flows, the said tubes extending across the width of the compartment, and baffles arranged to guide ascending gaseous phases issuing from the perforated plate next below said bundle up through some parts of the tube bundle and then down through the other portions of the cooling bundle, and thence up again to the perforated plate next above said bundle.

In more detail the invention relates more specifically to a new apparatus and process for carrying out the conventional reaction using carbon dioxide gas and an aqueous solution containing ammonia and sodium chloride to yield solid crystalline sodium bicarbonate. In carrying out this process and with the apparatus of the present invention, the gaseous carbon dioxide is flowed upwardly through a series of connecting compartments. These compartments have a perforated base or partition through which the gaseous carbon dioxide passes. A solution of ammonia and sodium chloride is passed downwardly through this series of compartments wherein the carbon dioxide and solution undergo a reaction which forms sodium bicarbonate. The sodium bicarbonate is suspended in the flowing solution and moves to the bottom of the connected compartments. Each compartment also has a conduit for passing the solution and the product from a compartment to the compartment below. The conduits are disposed so that the solution flowing from one compartment to the compartment below will not flow directly into another conduit, but will be caused to flow across the perforated plate or partition to the conduit supported thereby. Hence, while the gaseous carbon dioxide proceeds generally upwardly through the column of connecting compartments, the solution flows in a zigzag or partly lateral direction while moving downwardly through the column of connecting compartments. In the lower section of the column of connecting compartments a cooling means is disposed in each compartment. This cooling means is advantageously a tube bundle. Also, these lower compartments containing the cooling means, e.g. a tube bundle, are baffled to produce more than one pass of some gas across the tube bundle. Hence, the baffles cause the gas moving upwardly from a partition to pass through some portions of the tube bundle. Part of the gas after passing through the tube bundle is directed downwardly and then upwardly again to accomplish three passes through the tube bundle before exiting to the compartment above.

The compartments are conveniently cylindrical though they can be rectangular or of other shapes. When required for the carbonation stages of the ammonia-soda process they are conveniently from two to four feet deep and six to nine feet in diameter, and a convenient proportion between compartments having cooling tubes and those without such tubes is of the order of 10 to 15 without and 4 to 7 with tubes.

The perforated plates may be flat or dished. The perforations may be capped or cusped if desired, and may have inserts of other materials, for example polyvinyl chloride, to prevent or reduce abrasion and scaling.

The conduits through which crystals magma flows from one compartment to the next below are preferably adjacent to the sides of the compartment since in this position one can achieve a higher ratio of solids to liquids in the crystal magma than if the conduit were located elsewhere, for example centrally in the compartment, although even this arrangement is superior to the traditional passettes of Solvay towers. Also turbulence due to gas flow in the aqueous system is less near the sides and there is a lower concentration of gas bubbles there, and this enables the paths of gas and magma streams and the solid/liquid ratio to be more readily controlled. If desired a baffle system can be arranged vertically over or beside the upper orifice of a conduit to control the turbulence there but a high degree of turbulence over the area occupied by the perforations is desirable, since under such conditions the plates remain free of deposits of crystal magma.

The conduit can be in the form of only a downcomer, that is to say its upper orifice is flush with the upper surface of the perforated plate and it projects only into the compartment immediately beneath the plate. It can also be, and is often more conveniently, in the form of riser and downcomer, that is to say it projects upwards into one compartment and downwards into the compartment immediately below.

The conduits are usually arranged with their long axes vertically but they can also be arranged with the axes at an angle to the vertical. However arranged it should not be possible for magma issuing from a conduit into a compartment to fall directly into the orifice of a conduit leading out of the same compartment. If it did so fall it would escape full contact with the gaseous phase. A convenient arrangement is for the position of a conduit in one of the two perforated plates that define the depth of a compartment to be a quarter of the way round, measured circumferentially, from the position of a conduit in the other plate. In the carbonation stages of the ammonia-soda process the compartments operate efficiently when about three quarters full or half-full of magma of crystals and a convenient magma concentration in the compartments if the lengths of the conduits are suitably selected. For example, in a four-foot deep compartment a riser would have its orifice from eighteen inches to two feet above the plane of the perforated plate that supports it, and a downcomer would have its orifice not more than two feet below the plate from which it depends. A suitable range for the internal diameters of risers or downcomers in compartments in which carbonation stages of the ammonia-soda process take place is from 9 to 18 inches.

The perforations may be of any suitable shape but circular are the most convenient. They may be arranged in various patterns, but very satisfactory absorption of gas and stirring of the system can be achieved by having them arranged in concentric circles in the compartments that do not contain cooling tubes, and in rows in those compartments that do, the rows then being arranged to run in the same direction as the run of the tubes. The principle that governs the arranging of the perforations and their number is that the gas passing through them should provide adequate stirring of the system at the same time as it is reacting, adequate stirring being understood as meaning the prevention of the formation of deposits of crystal magma. The perforations conveniently have each a cross-section area of from 0.75 to 7.0 square inches, for example if circular their diameters are approximately one to three inches, and one or two per square foot of plate area is a convenient density for carbonation in the ammonia-soda process. It should be realized however that these values admit of variation, and the optimum choice will depend on local conditions governed by the principles hereinbefore described, and the rate of production required from the tower as it varies from time to time.

For instance, if the perforations are capped the gas is properly distributed by the serrations of the cap edges and the number of perforations may be reduced.

Among the advantages gained when the apparatus of the invention is used in the ammonia-soda process are reduced supersaturation, and slower growth of crystals of given size, and slower growth of scale, or smaller numbers of larger crystals. Lower supersaturation leads to crystals of more nearly equidimensional form and having a reduced tendency to acquire brushlike or dendritic growths at their ends. This makes their separation from the magma easier.

The invention is illustrated by the accompanying drawing, wherein.

Figure 1:
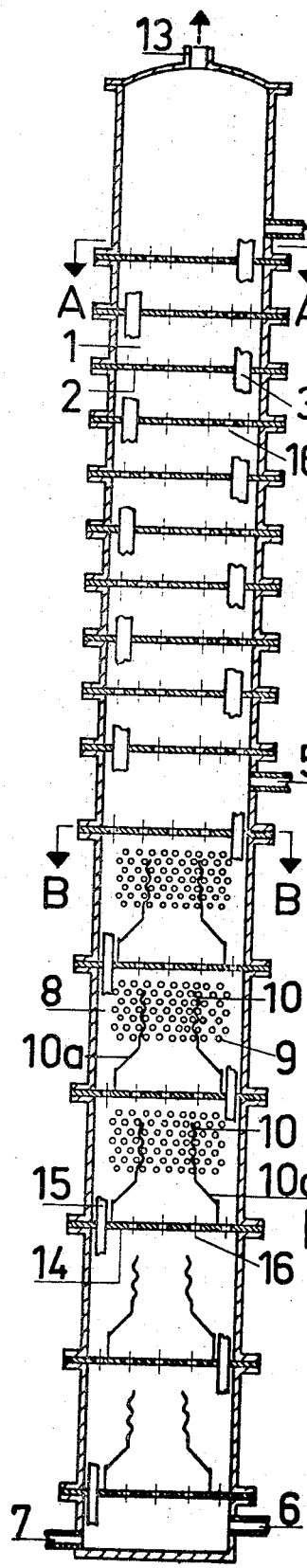
FIG. 1 is a cross-sectional elevational view of the column of compartments.
Figure 2:
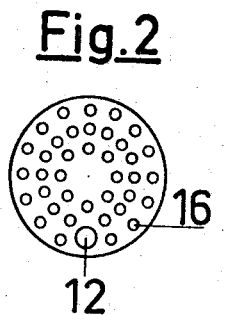
FIG. 2 is a plan view of a perforated plate forming a partition between adjacent compartments that do not contain cooling tubes.

In FIG. 1, the section between AA and BB represents compartments not containing cooling tubes while the section below BB represents compartments that do contain cooling tubes. In FIG. 1 a typical compartment is represented by 1, a partition by 2 and a conduit supported thereby, and in the form of downcomer and riser, by 3. An inlet to the column for liquors is represented by 4 and for gases by 5 and 6, while 7 represents an exit for magma, and 13 is an exit for waste gases. A typical compartment containing cooling tubes is represented by 8, and a bundle of tubes by 9. An upper part of a baffle is represented by 10, while the lower part of the baffle is represented by 10a. A partition is represented by 14 and a conduit by 15. The conduit 15, shown as 11 in FIG. 3, fits into the space between the cooling tubes and the side of the compartment. In FIG. 2 the conduit 3 is shown as 12.

Figure 3:
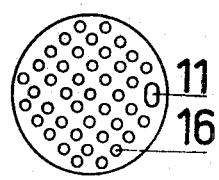
FIG. 3 is a plan view of a perforated plate forming a partition between adjacent compartments that contain cooling tubes.

Also in FIGS. 1, 2 and 3 the perforations in the plates are shown as 16. Furthermore, in FIG. 1, the lowermost two compartments are shown without the tube bundle therein in order to more clearly show the upper and lower parts 10 and 10a of the baffle.

Figure 4:
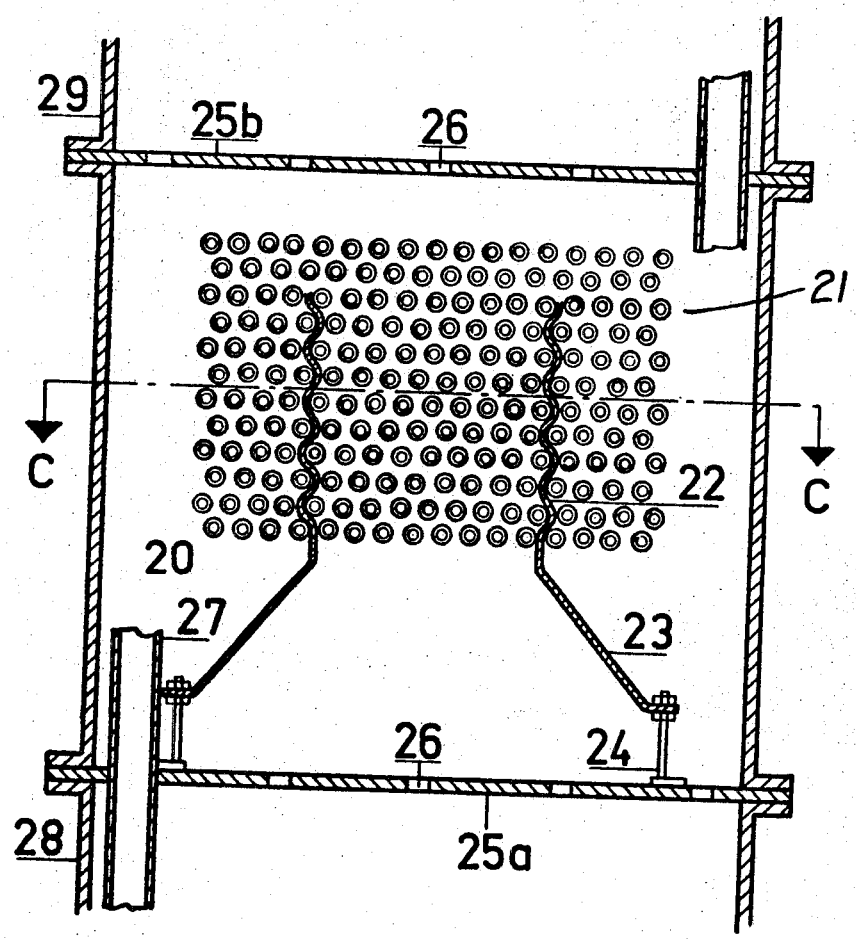
FIG. 4 is a cross-sectional elevation of a compartment which contains cooling tubes.

In FIG. 4, there is shown a compartment 20 containing a bundle of tubes 21, which tube bundle contains a baffle having an upper part 22, a lower part 23 and a support 24. The plate 25a separating the compartment 20 from the lower compartment 28 (shown partially) and the plate 25b separating compartment 20 from upper compartment 29 (shown partially) have a plurality of perforations 26 therein. The plate 25a supports a conduit 27 which connects compartment 20 with the next lower compartment 28.

Figure 5:
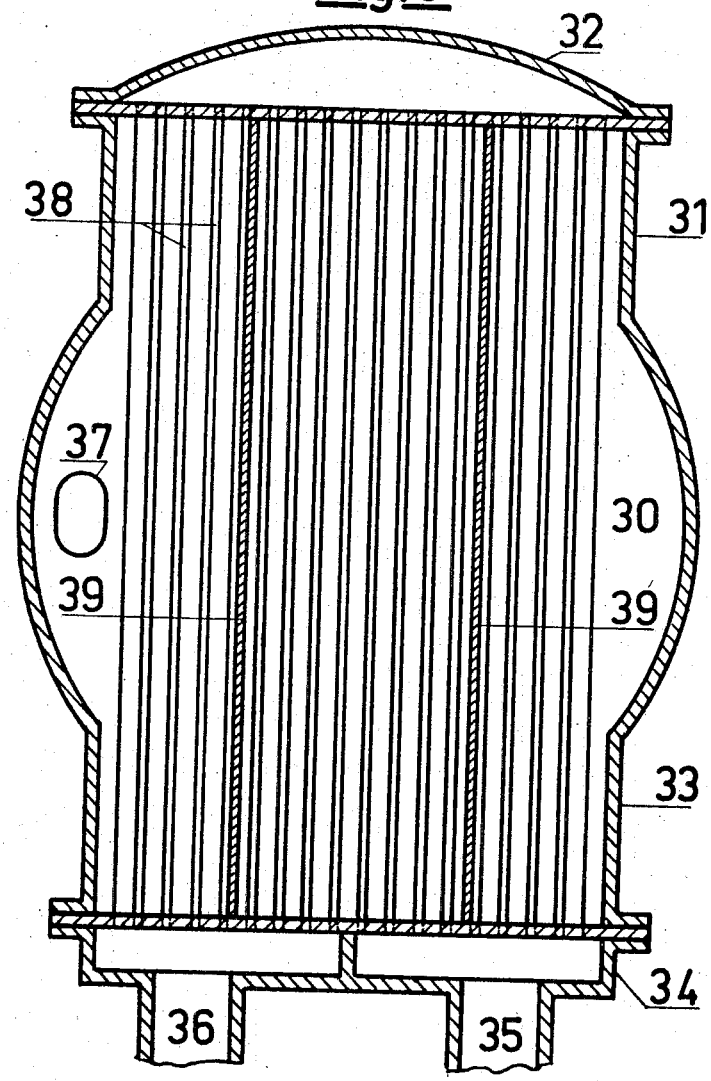
FIG. 5 is a horizontal section according to plan CC of a column compartment which contains cooling tubes.

In FIG. 5, there is shown a compartment 30 having a tube assembly bulkhead 31 with a suitable cover 32 and a further bulkhead 33 with a suitable cover 34 having ports 35 and 36 therein which may be used for introducing and removing the cooling water. Also in FIG. 5, there is shown the conduit 37, the cooling tubes 38 and the upper part 39 of the baffles.

Figure 6:
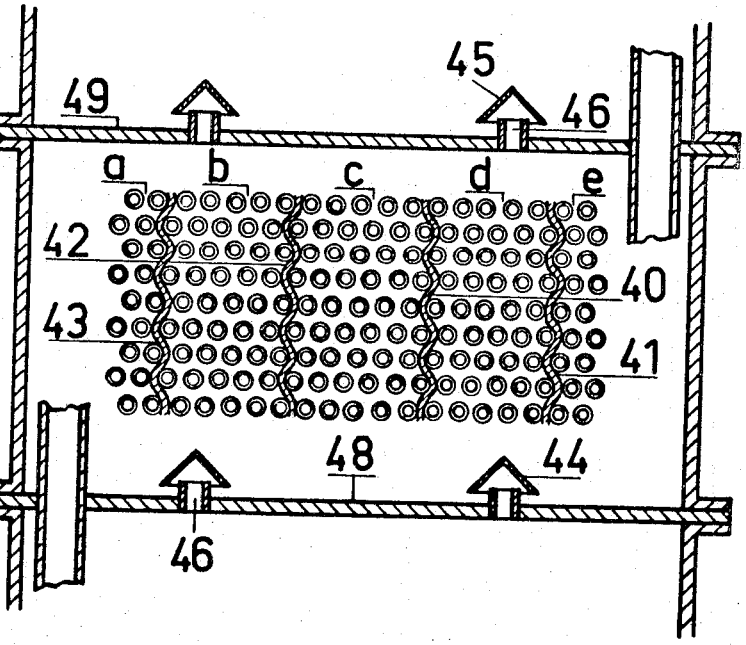
FIG. 6 shows essentially the same apparatus as FIG. 4, except that FIG. 6 additionally shows a plurality of baffles in a compartment which contains cooling tubes, and additionally it shows caps placed above the perforations of the compartment plates.

In FIG. 6, there is shown a similar compartment as that of FIG. 4 except that there are provided a plurality of baffles 40, 41, 42 and 43 which establish sections a, b, c, d and e as well as caps 44 and 45 on the perforations 46 of plates 48 and 49. The caps may be in any desired form such as baffle caps, serrated caps, toothed caps, etc. The baffles 40–43 may be attached to the compartment and/or tube bundle as desired, e.g. by clamps, brackets, bolts or welding. The particular manner of attachment is not important.

Turning now to the operation of the compartments, attention is directed to FIG. 4. The gases passing through the perforations 26 of plate 25a are gathered by the lower part 23 of the baffle and passed centrally through the tube bundle. The gases form a "gas cushion" beneath plate 25b and are forced downwardly and outwardly toward plate 25a and the walls of the compartment. However, as gases pass through the perforations 26 of plate 25b, there is caused a "backflow" of the gases that moved downwardly and outwardly toward the walls of the compartment and plate 25a. Hence this "backflow" of gases move again outwardly but also upwardly toward plate 25b and pass through the perforations 26 thereof.

In regard to FIG. 6, viewing the figure from left to right the four baffles 40–43 form five sections, i.e., a, b, c, d and e. The perforations (shown as having caps thereon) pass the gases, upwardly through sections b and d and then downwardly and outwardly through sections a and e as well as centrally through c due to the "gas cushion" established underneath plate 49. The gases again move outwardly and upwardly through plate 49 in a manner and for the reasons discussed in connection with FIG. 4.

The following example will illustrate an embodiment of the invention, i.e. that of FIG. 6, but it is to be understood that the invention is fully applicable to the foregoing disclosure.

EXAMPLE

Sodium bicarbonate in an ammonia-soda solution is produced in a column equipped according to the present invention as shown in FIG. 1 and with the baffles and capped perforations of FIG. 6. This column has a diameter of 2.7 m. and a total height of 25 m. As far as the dimensions as a whole are concerned or the position of entrances and exits of liquids and gases, as well as the exit of "magma" which contains the crystallized soda bicarbonate in suspension, there is no great distinction between the columns conventionally used in the soda industry and the present column.

All the details concerning the parameters of conventional columns and their working conditions are fully disclosed in the book of Te-Pang Hou, Manufacture of Soda, Reinhold Publishing Corporation, New York, 2nd edition, 1942 which reference is incorporated herein.

The column was divided into 21 superimposed compartments, separated by horizontal, flat perforated plates.

The seven lower compartments were cooling compartments and contained bundles of horizontal parallel refrigerating tubes disposed through the compartments. The details of the tube bundles are similar to the details of tube bundles of conventional columns.

The 14 upper compartments did not contain refrigerating tube bundles and are hereinafter called "carbonation compartments."

The height of the various sections of the column was as follows:

| | M. |
|---|---|
| Height of the upper compartment and the clearing zone above | 3.00 |
| Height of the 13 carbonation compartments (13 x 0.80) | 10.40 |
| Height of the 6 cooling compartments (6 x 1.45) | 8.70 |
| Height of the lower compartment | 2.70 |

The perforation of the flat plates which separated the cooling compartments was in the form of 8 holes of a diameter of 54 mm. distributed in two parallel rows. The holes were topped with toothed bells, similar in design to those currently employed in distillation plates. Each plate supported a vertical, cylindrical conduit, approximately circular, with a section of 7.5 dm.$^2$, which permitted the descent of the magma formed by the liquid and the crystals of soda bicarbonate in suspension. The upper edge of the conduit was 150 mm. from the top of the plate while its lower edge was at 350 mm. underneath. Thus the total length of the conduit is 500 mm. The conduit is located in the immediate neighborhood of the wall of the column, at one end of the perpendicular diameter to the refrigerating tubes and to the rows of perforations. The conduits of the neighboring plates are located alternatively at one or the other end of this diameter. According to FIG. 6 each cooling compartment is fitted with 4 baffle deflectors disposed vertically and in parallel to the refrigerating tubes; a section of a compartment is thus divided into 5 zones, a, b, c, d, e corresponding to the zone formed by the 4 baffle deflectors when viewing the compartment from left to right. The perforations of the plates were located under zones *b* and *d*. Circulation of the magma is thus realized: a mixture of magma and gaseous bubbles rises in zones *b* and *d* while the magma goes down again in the lateral zones *a* and *e* as well as in the central zone *c*. The lower edge of the baffle deflectors was at 220 mm. above the perforated plate; the height of the deflectors was of 840 mm.

The carbonation compartments have a similar equipment, included 4 baffle deflectors of 300 mm. height, located at 150 mm. above the perforated plate underneath, but each plate was perforated with 12 holes in 3 rows of 4 holes located under zones *b*, *c*, *d*. With this disposition the circulation of magma in the carbonate compartments has little importance. On the other hand, certain dimensions differ from those adopted in the cooling compartments:

diameter of the perforations: 60 mm.
upper edge of the conduits at 300 mm. above the plates
lower edge of the conduits at 700 mm. under the plates.

There is no plate under the first cooling compartment, in the lower part of the column. The introduction of gas at the bottom of the apparatus was accomplished by two toothed cap distributing rows, placed under zones *b* and *d*. The deflectors of this first compartment had a height of 1600 mm.

Concerning the rates of flow of reagent solutions, liquids and gases entering and exiting from the column, as well as the temperatures and compositions of these phases, these were the same as used in conventional columns.

The profile of temperatures realized in the column was also the same as in the conventional columns. One notes, however, that this result is obtained with a rate of flow of refrigeration water decreased by 30%, which corresponds to an improvement in the transfer of heat between the suspension contained in the column and the refrigerating water circulating in the tubes.

Although all the working conditions have remained the same as in conventional apparatuses, it is to be noted that the new column adopted according to the present invention lead to clearly improved results as far as the quality of the bicarbonate produced is concerned. This can be translated by the production of bigger and better formed crystals, as indicated by the following comparison of soda bicarbonates obtained (drained products, washed with methyl alcohol and dried in open air):

| Granulometric composition | New column | Conventional column |
|---|---|---|
| >0.350 mm. (percent) | 1 | 0 |
| 0.250–0.350 mm. (percent) | 12 | 0 |
| 0.177–0.250 mm. (percent) | 24 | 0 |
| 0.125–0.177 mm. (percent) | 28 | 11 |
| 0.088–0.125 mm. (percent) | 21 | 32 |
| 0.062–0.088 mm. (percent) | 7 | 25 |
| 0.044–0.062 mm. (percent) | 3 | 22 |
| <0.044 mm. (percent) | 4 | 10 |
| Free flow density | 0.85 | 0.62 |

The median size of the sodium bicarbonate produced is thus improved from 0.080 mm. to 0.150 mm. due to the new column of the invention. The increase of free flow density brings improvement in the form of the crystals. This improvement is integrally attributable to the new geometry of the column since working conditions of conventional columns have been systematically adopted.

Sodium bicarbonate of the conventional columns is usually drained on a rotative filter, which is the apparatus that proved the most economical for this type of crystals. One thus obtains a wet product with about 15% water content. The sodium bicarbonate of the column according to the invention, clearly more granulated, can advantageously be treated on a centrifugal dryer; its water content is then of only 8%. There results an important decrease of drying expenses.

It should be noted that the granulometric composition is not modified during calcination of the sodium bicarbonate and the quality of the light soda is equally improved in the same way as the raw bicarbonate.

What we claim is:

1. In the process for producing sodium bicarbonate by reacting carbon dioxide gas with an aqueous solution of ammonia and sodium chloride to yield the solid crystalline product suspended in the solution, the improvement comprising passing the gas upwardly into and through a series of connecting compartments each of which have a base with a plurality of perforations for passing the gas therethrough and a conduit disposed in the said base, flowing the solution and the product suspended therein downwardly into and then laterally through each compartment, the solution and the product suspended therein being passed from one compartment to the next thereunder by the said conduit, the said gas being flowed through the perforated base at a rate sufficient to agitate the solution and keep the solid product suspended therein and to prevent any substantial amount of solution or product suspended therein from passing through the perforations of the said perforated base, and wherein the solution and product suspended therein flowing laterally in at least one of the compartments is passed over a bundle of cooling tubes disposed therein, said cooling tubes being disposed in a lateral direction and the gaseous phases are caused to pass upwardly through some parts of the bundle of cooling tubes, then downwardly through the other portions of the cooling bundle and then upwardly by means of baffles disposed in the said compartments.

2. A process as claimed in claim 1 in which in those compartments that do not contain cooling tubes the perforations in the perforated plates are arranged in concentric circles and in those compartments that do contain cooling tubes the perforations are arranged in rows running under the cooling tubes and in the same direction as the run of the tubes.

3. A process as claimed in claim 2 in which the conduits are adjacent to the sides of the compartments, each conduit being in the form of a downcomer that projects upwards into one compartment and downwards into the compartment immediately below it.

4. A process as claimed in claim 3 in which the conduits are inclined at angles to the vertical.

5. A process for making sodium bicarbonate as claimed in claim 1 in which the column comprises 10 to 15 compartments that do not contain cooling tubes, and 4 to 7 compartments that do contain cooling tubes.

6. A process for making sodium bicarbonate as claimed in claim 5 in which the compartments are from six to nine feet in diameter and from two to four feet in depth, and the internal diameters of the conduits are from nine to eighteen inches.

7. A process for making sodium bicarbonate as claimed in claim 6 in which per square foot of perforated plate area there are one to two perforations and each perforation has a cross section area of 0.75 to 7.0 square inches.

References Cited

UNITED STATES PATENTS 2,942,942    6/1960    Hoff _____ 23—65

OSCAR R. VERTIZ, Primary Examiner

G. T. OZAKI, Assistant Examiner

U.S. Cl. X.R.

23—265, 273, 283